R. WETHERILL.
VALVE GEAR FOR STEAM ENGINES.
APPLICATION FILED MAY 4, 1912.
1,077,898.
Patented Nov. 4, 1913.
2 SHEETS—SHEET 1.
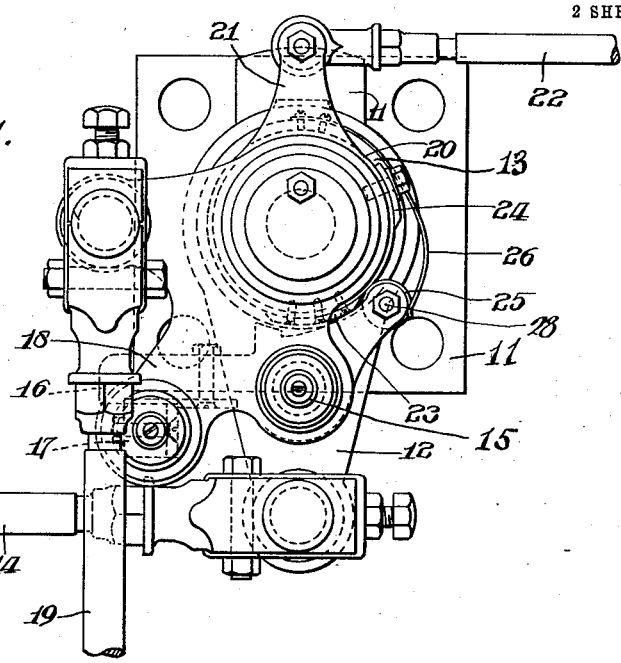
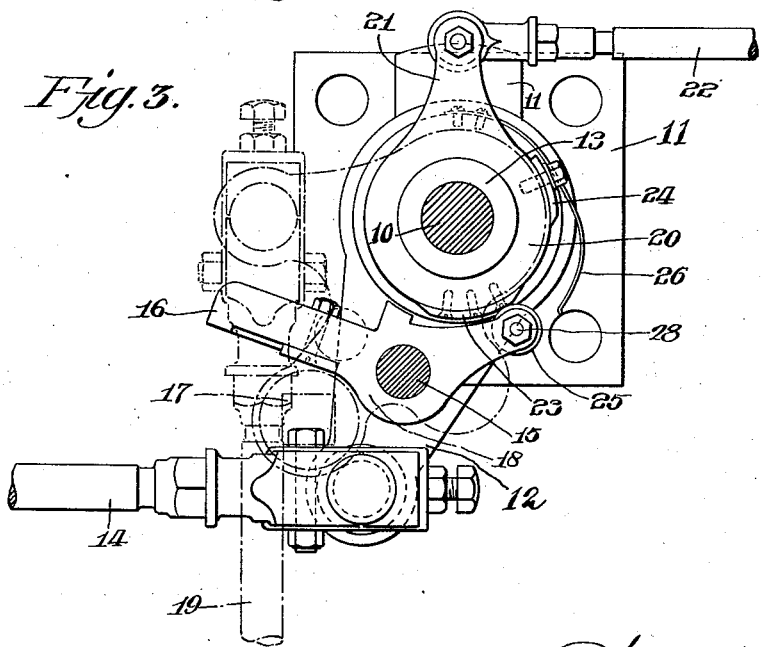
WITNESSES
INVENTOR
Robert Wetherill
BY
ATTORNEY R. WETHERILL.
VALVE GEAR FOR STEAM ENGINES.
APPLICATION FILED MAY 4, 1912.
1,077,898.
Patented Nov. 4, 1913.
2 SHEETS—SHEET 2.
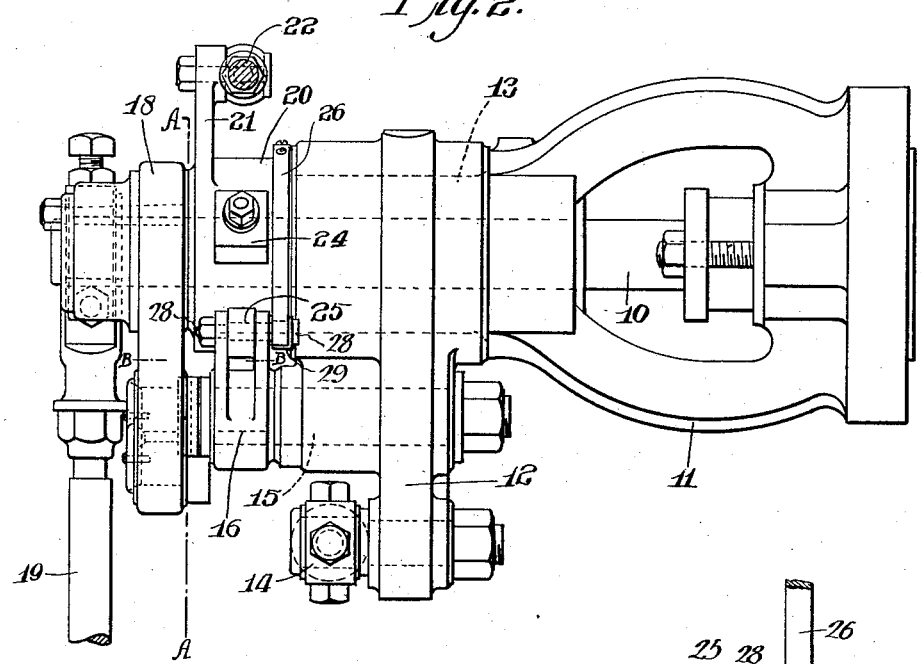
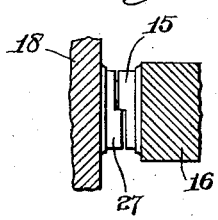

UNITED STATES PATENT OFFICE.

ROBERT WETHERILL, OF CHESTER, PENNSYLVANIA, ASSIGNOR TO ROBERT WETHERILL & COMPANY, INCORPORATED, OF CHESTER, PENNSYLVANIA, A CORPORATION OF PENNSYLVANIA.

VALVE-GEAR FOR STEAM-ENGINES.

1,077,898. Specification of Letters Patent. Patented Nov. 4, 1913.

Application filed May 4, 1912. Serial No. 695,051.

*To all whom it may concern:*

Be it known that I, ROBERT WETHERILL, a citizen of the United States, and a resident of Chester, in the county of Delaware and State of Pennsylvania, have invented certain new and useful Improvements in Valve-Gear for Steam-Engines, of which the following is a specification.

My invention relates to improvements in valve gears for steam engines and the objects of my invention are as follows:—
First:—to furnish a valve gear that will be positive in its operation at high or low speeds. Second:—to furnish in connection with the arm which operates the stem of the steam valve, and the vacuum pot which normally operates through this arm to close the valve, a means operated by the movement of the driving lever for positively operating said arm to close the steam valve should the vacuum pot fail to do so. Third:—to furnish a means for accelerating at end of stroke and making positive the movement of the gravity hook by means of which the forward movement of the driving lever is transferred to the valve stem operating arm. Fourth:—to furnish an improved form of variable-cut-off. Fifth:— to furnish a means for instantly closing the steam valve should the governor be rendered inoperative. Sixth:—to furnish certain other details hereinafter described.

In the accompanying drawings forming part of this specification, and in which similar letters of reference indicate similar parts throughout the several views;—Figure 1, is a front elevation of the valve gear of a Corliss engine embodying my improvements; Fig. 2, a side elevation of Fig. 1; Fig. 3, a section of Fig. 2 on line A—A, the driving lever being shown fully advanced and the gravity hook, carried thereby, fully raised; Fig. 4, a section of Fig. 2 on line B—B. Fig. 5 represents an enlarged detail of the upper end of the gravity hook with parts broken away to show the bearing point of the accelerator.

10 is one of the inlet valve stems of the engine. 11 a bracket supporting valve stem 10. 12 a driving lever, which is carried by a hub 13 carried by bracket 11, the lower end of which is connected by a rod 14 with the wrist plate of the engine which is not shown.

15 is a stationary pin carried by the driving lever which pivotally carries the gravity hook 16 the forward end of which is adapted to engage with a hook-block 17 on the operating arm 18 which is keyed to the valve stem 10.

19 is a rod the upper end of which is carried by the arm 18 and the lower end of which is connected to a vacuum pot, not shown, in the usual manner.

20 is a collar, rotatably carried upon the hub 13 which carries valve stem 10, which is furnished with an arm 21 which is connected by a rod 22 with any well known form of governor, not shown. Upon the collar 20 are cams 23—24.

25 is a roller upon the rear end of the gravity hook 16, which rides on said collar and its cams.

26 is an accelerator in the form of a spring guide the upper end of which is secured to bracket 11 and the lower end of which is free and adapted to engage roller 29 on one end of bolt 28 in the forked end of the gravity hook 16, or the gravity hook itself to accelerate the movement of this hook in its engagement with the block 17 on the lever 18.

The reciprocating movements of the wrist plate are transmitted through rod 14 to the driving lever 12 which is rocked back and forth upon the hub 13.

In Fig. 1 the driving lever is shown all the way back and the hook 16 in engagement with the hook-block 17 on the valve lever 18. In this position the valve is closed. The next movement of the wrist plate will move rod 14 to the left which will move the driving lever with it and the hook 16 will carry forward the hook-block 17 and the valve lever 18 the latter rotating the valve stem 10 and opening the valve. When the driving lever and the hook 16 are moved forward the roller 25 on the rear end of the latter presently engages the cam 23 which moves the rear end of hook 16 downward and its forward end upward out of engagement with hook-block 17. As soon as this takes place the vacuum pot connected to rod 19 draws this rod down and the valve lever is returned to its first position closing the valve. The wrist plate having completed its forward reciprocation now commences its backward movement and the rod 14 pushes the driving lever 12 back to its first position during which movement the hook plate 16 is by gravity, assisted at end of stroke by the guide 26 which engages and lifts lever 18, caused to engage the hook-block 17.

The hook will usually engage the hook-block by gravity alone, but the accelerator guide makes a "full hook up" positive, necessitates but very little clearance for the hook-block in the hook notch, and reduces the jar and noise incident thereto caused by the engagement of the hook and hook-block to the minimum.

It is essential that the steam valve be closed completely after every opening and the vacuum-pot connected to rod 19 will usually accomplish this. If, however, some accident should prevent the pot from doing its work completely I have arranged that the valve stem lever will be brought down by the backward movement of the driving lever 12 until it rotates the valve stem 10 sufficiently to close the valve and this I do by placing a clutch device which may be in the form of stops upon these two levers, that upon the driving lever engaging the one upon the valve stem lever upon the backward movement of the former and remaining in engagement until the valve has been completely closed. For this purpose I prolong the pin 15, which carries the hook 16, some distance out from the hook and I place upon the inner side of the valve stem lever 18 a pin 27, best shown in Fig. 4—which will be engaged by pin 15. It will be understood that the pins 15—27 do not necessarily engage unless the lever 18 is not fully operated by its vacuum pot.

As has been before stated the governor, which is so well known both as to construction and operation that it has not been thought necessary to illustrate it, is connected through a rod 22 with an arm 21 which is secured to collar 20 which carries cams 23—24. The movements of the governor will be transmitted through rod 22 to collar 20. If the load upon the engine is light the governor will be driven faster and will move rod 22 to the left which will similarly turn collar 20 and bring the cam 23 into position to be sooner engaged by roller 25 on hook plate 16 when the driving lever 12 is rocked to the left. This will cause the hook to sooner release the hook-block 17 and the valve stem lever 18 to sooner close the stem valve. A greater load on the engine will cause these movements to be reversed and the steam valve will be more widely opened. An automatic variable cut off is thus established which instantly responds to varying loads upon the engine.

Should the mechanism driving the governor fail to operate the rod 22 will draw the collar 20 to the right and the cam 24 will be moved into contact with roller 25 which will elevate the forward end of the hook-plate 16 to such an extent that it cannot contact with the hook-block 17 to cause a movement of the valve stem lever 18, hence the valve will remain closed until the governor or its connections are repaired or adjusted.

Having thus described my invention I claim as new and desire to secure by Letters Patent:

1. In a steam engine valve gear the combination of a hook block, a gravity hook adapted to engage said block, and an accelerator for said gravity hook normally out of contact therewith and adapted to engage said gravity hook just before the latter's engagement with said hook block.

2. In a steam engine valve gear the combination of a hook block, a gravity hook adapted to engage said block, and an accelerator in the form of a spring guide for said gravity hook normally out of contact therewith and adapted to engage said gravity hook just before the latter's engagement with said hook block.

3. The combination with the valve and valve stem of a steam engine, of an operating lever secured to said valve stem, a driving lever, a hook pivotally carried by said driving lever, means for reciprocating said latter lever, means operated by a governor for disengaging said hook from said operating lever, said governor, and a spring accelerator normally out of contact with said hook and adapted to engage it immediately before the latter's engagement with said operating lever.

4. The combination with the valve and valve stem of a steam engine, of a bracket surrounding said valve stem, a driving lever carried by said bracket, a means for reciprocating said lever, a gravity hook pivotally carried by said driving lever, an operating lever secured to said valve stem, a hook-block carried by said operating lever, a means for operating said valve stem to close the valve when said hook-block is out of engagement with said gravity hook, a means operated by a governor for causing said gravity hook to disengage said hook-block, and an accelerator normally out of contact with said hook and operative to engage said gravity hook immediately before the latter's engagement with said hook block.

5. In a valve gear, the combination of a valve stem, an operating lever connected thereto, a driving lever, means for operating said driving lever, and a clutch device on said levers adapted to engage in the forward stroke of the driving lever to open the valve and on the reverse stroke thereof to close the valve.

6. In a valve gear, the combination of a valve stem, an operating lever connected thereto, a driving lever, and means for oscillating said driving lever, said levers being provided with interacting projections which engage on the forward stroke of the driving lever to open the valve and on the reverse stroke of said lever to close the valve.

ROBERT WETHERILL.

Witnesses:
   J. EARL HOWARD,
   GEO. W. ROBERTS.

Copies of this patent may be obtained for five cents each, by addressing the "Commissioner of Patents, Washington, D. C."